March 6, 1934. T. V. BUCKWALTER 1,949,824
ROLLER BEARING AND CAGE
Filed June 3, 1932 2 Sheets-Sheet 1

INVENTOR:
Tracy V. Buckwalter,
by Cam Plan Hgravely,
HIS ATTORNEYS.

March 6, 1934. T. V. BUCKWALTER 1,949,824
ROLLER BEARING AND CAGE
Filed June 3, 1932 2 Sheets-Sheet 2
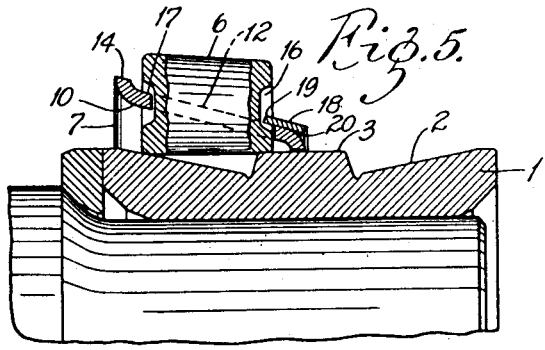
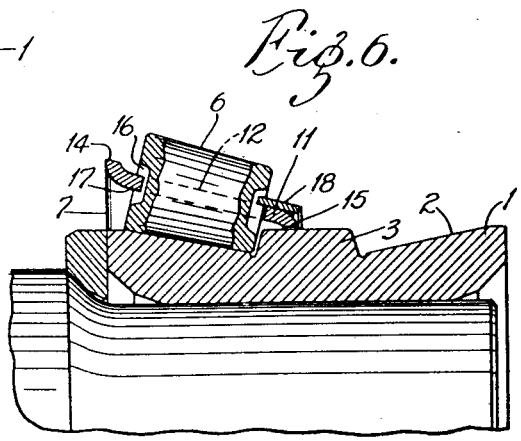
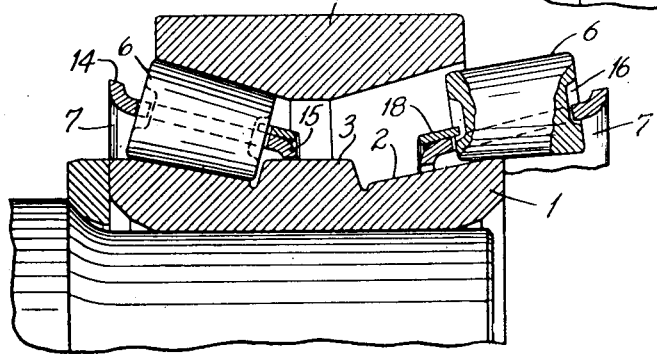
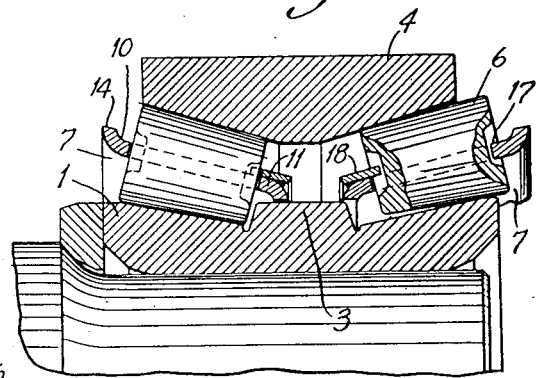
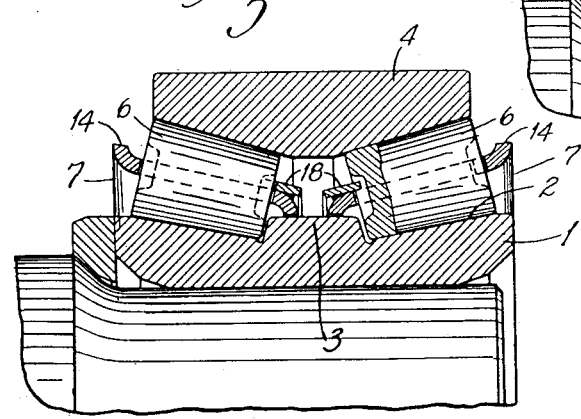
INVENTOR:
Tracy V. Buckwalter,
by Can Kan Gravely.
HIS ATTORNEYS.

Patented Mar. 6, 1934

1,949,824

UNITED STATES PATENT OFFICE 1,949,824

ROLLER BEARING AND CAGE

Tracy V. Buckwalter, Canton, Ohio, assignor to The Timken Roller Bearing Company, Canton, Ohio, a corporation of Ohio Application June 3, 1932, Serial No. 615,149

6 Claims. (Cl. 308—214)

My invention relates to roller bearings and cages therefor and has for its principal object a construction in which the cage and rollers constitute a self-contained unit that can be easily assembled with the race members and dissembled therefrom. The invention consists principally in a roller bearing wherein the rollers have enlarged axial recesses in both ends and wherein the cage has pintle portions of smaller size projecting into said enlarged openings, whereby the rollers are allowed considerable movement with respect to the cage but constitute a self-contained unit with the cage.

The invention further consists in the roller bearing and cage therefor and in the parts and arrangements and combinations of parts hereinafter described and claimed.

Figure 1:
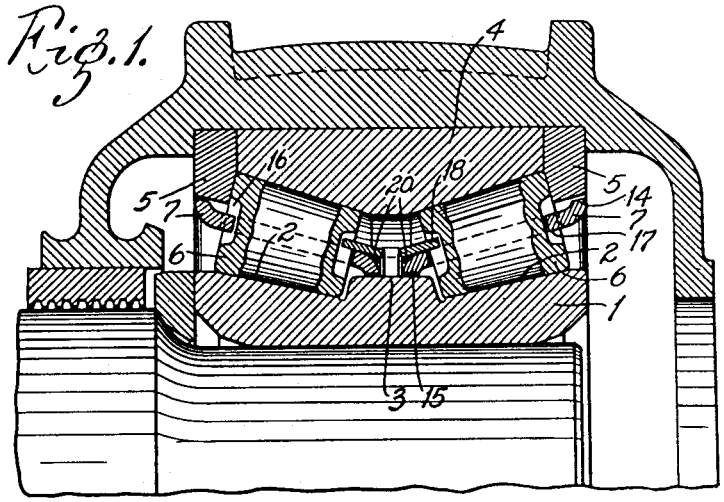
Figures 2, 3:
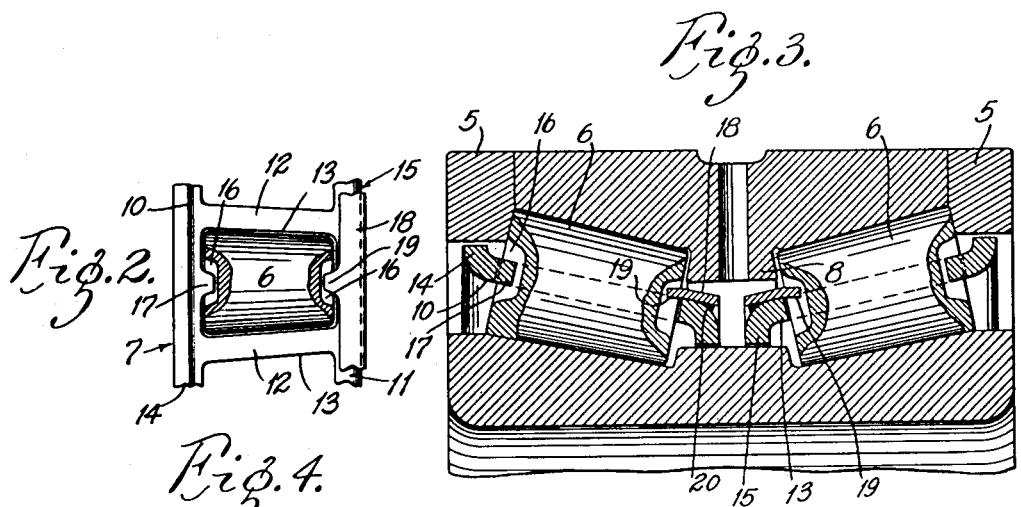
Figure 4:
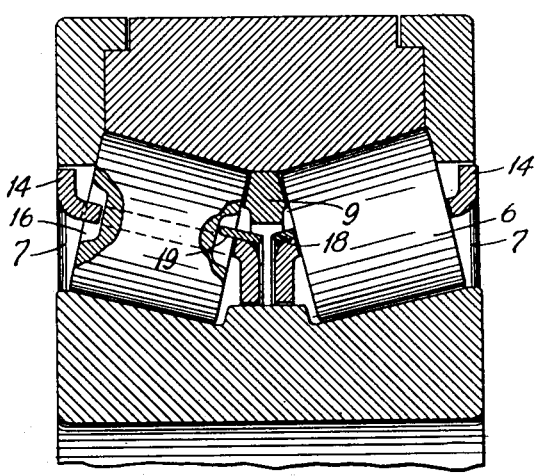

In the accompanying drawings, wherein like symbols refer to like parts wherever they occur, Fig. 1 is a partial sectional view of a roller bearing and cage embodying my invention, Fig. 2 is a fragmentary plan view of the cage and a single roller mounted in one of the pockets of the cage, Figs. 3 and 4 are sectional views similar to Fig. 1 showing modifications, and Figs. 5, 6, 7, 8, and 9 are views similar to Fig. 1 showing steps in the process of assembling the bearing.

Particularly in large heavy duty bearings such as those used in railway rolling stock and heavy machinery, it is desirable that the rollers and cage constitute a self-contained unit so that they may be removed from the bearing members to permit inspection of all parts of the bearing. Ordinary constructions of this type are quite difficult to assemble and disassemble, especially if the bearing is of the double row type so common in such installations. With these ends in view the present construction is designed to permit easy assembly and disassembly of a double row bearing and to make a self-contained unit of the rollers and cage.

In Fig. 1 is illustrated a double row roller bearing including an integral double cone member 1 having raceway portions 2 tapering toward the middle and having an annular rib 3 at the middle, a double bearing cup 4 having separate thrust rib members 5 at its ends, conical bearing rollers 6 and cages therefor indicated generally by 7. In the construction illustrated in Fig. 3, the cup is provided with an annular rib 8 at its middle portion so that the rollers are closely confined between said rib 8 and the separate thrust rib members 5. In the construction shown in Fig. 4, a separate floating ring member 9 is interposed between the small ends of the rollers.

The cage body 7 is a hollow conical member having a large end ring 10 and a small end ring 11 connected by bridges 12 forming pockets 13 for the rollers. An annular flange 14 at the large end of said cage 7 is disposed outwardly to fit in the inner periphery of the thrust rib 5 and an inturned annular flange 15 at the small end fits closely over the rib 3 at the middle of the bearing cone 1.

The rollers have axial depressions 16 in each end, said depressions being of considerable diameter. At its large end the cage 7 is provided with pintles 17 projecting into the depressions 16 in the large ends of the rollers; and at its small end the cage has a separate retaining ring member 18 secured thereto, said retaining ring 18 having pintles 19 projecting into the depressions 16 in the small ends of the rollers 6. Said retaining ring 18 is secured on the cage body 7 by welding or other suitable means, spot welding being indicated at 20.

By reason of the positions of the pintles 17 and 19 of the cage and retaining ring, respectively, in the depressions 16 of the rollers, each set of rollers 6 and cage 7 make up a self-contained unit separable from the bearing members. At the same time, the rollers 6 are permitted considerable movement with respect to the cage 7, in a direction radially or transversely of the bearing, by reason of the fact that the depressions 16 are considerably larger than the pintles 17 and 19. This capacity of the rollers for movement facilitates the operation of assembling and disassembling the bearings, since it permits tilting or radial movement of the rollers to clear the large end of the cone and to clear the rib at the middle of the cone.

Figs. 5 to 9, inclusive, illustrate the process of assembling a double row bearing. As appears in Fig. 5, a complete cage and roller assembly is slipped over one end of the cone, the rollers 6 being tilted to clear the large end of the cone 1 and to clear the rib 3 at the middle of the cone whose diameter is illustrated as being substantially the same as that of the large end of the cone. In Fig. 5, the cage and roller assembly for the left hand raceway is illustrated as being applied from the outer or right hand end, as will ordinarily be required in railroad practice. In some installations, however, the construction will be such as to permit the rollers being mounted from the left side of the bearing as well as from the right. After one cage and roller assembly is in place as shown in Fig. 6, the cup member is positioned thereon and the second cage and roller assembly placed in position as shown in Figs. 7 and 8.

Fig. 9 shows the assembly of both sets of rollers complete, except for the mounting of the separate thrust rib members on the ends of the bearing cup. These thrust ribs will be positioned in accordance with the requirements of the particular device. Thus, the left thrust rib may be passed over the cone before the first series of rollers and then await the completion of the assembling as far as shown in Fig. 9, or in some cases, it may be possible to slip both thrust rings over the axle member on which the bearing is mounted, after the assembly of Fig. 9 is completed.

The disassembling process is carried out by reversing the foregoing steps. For purposes of inspection, the process of disassembling may be stopped at any desired point to permit the separation of portions of the bearings and inspection of the rollers and bearing members.

The above described construction permits easy assembly of a cage and roller unit on a conical bearing member, permitting tilting or spreading of the rollers radially of the bearing to clear the large end of said conical member. It is simple and sturdy in its construction. In normal operation of the bearing, alinement of the rollers is taken care of in the usual way by the rib members and the ends of the rollers, thereby greatly relieving the cage of any guiding function, minimizing wear of the cage and minimizing friction. The invention is applicable to multiple bearing arrangements generally, whether a number of double bearing members be placed end to end or whether three or more races be formed upon a single bearing member. Obviously, a self-contained cage and roller assembly which, at the same time, permits considerable movement of the rollers in the cage has important advantages.

What I claim is:

1. A self-contained roller and cage assembly comprising an annular series of conical rollers having enlarged axial depressions in their ends and a cage for said rollers having pintles fitting loosely enough in said depressions to permit the assembled rollers to assume a position wherein elements of their conical surface are parallel to the axis of the bearing to permit assembly.

2. A self-contained roller and cage assembly comprising an annular series of rollers having axial depressions in their ends and a cage for said rollers having integral pintles at one end fitting loosely in said depressions in one end of said rollers and having a separate ring secured to the other end with pintles projecting into the depressions in the other end of said rollers.

3. A taper roller bearing comprising an inner bearing member having conical raceway portions tapering towards the middle of said bearing member and a self-contained conical cage and roller assembly on each raceway portion, said rollers having sufficient movement in said cages to permit assembly of the rollers and cages over the end of said inner bearing member.

4. A taper roller bearing comprising an integral inner bearing member having conical raceway portions tapering towards the middle of said bearing member, an integral outer bearing member having corresponding conical raceway portions and a self-contained cage and conical roller assembly interposed between each pair of raceway portions, said rollers having sufficient movement in said cages to permit assembly of the rollers and cages over the large end of said inner bearing member.

5. A tapered roller bearing comprising an integral inner bearing member having conical raceway portions tapering toward the middle of said bearing member, an outer bearing member having conical raceway portions tapering towards the middle of said bearing member, said outer raceway member having separable thrust rings at outer ends and a self-contained conical cage and roller assembly on each raceway portion, said rollers having sufficient radial movement in said cages to permit them to assume a position with an element of their conical body parallel to the axis of the bearing.

6. A taper roller bearing comprising a conical inner bearing member and a self-contained conical cage and roller assembly capable of being mounted over the large end of said inner bearing member, said rollers having enlarged axial depressions in both ends and said cage having pintles fitting loosely enough in said depressions to permit the assembled rollers to assume a position wherein elements of their conical bearing surfaces are parallel to the axis of the bearing.

TRACY V. BUCKWALTER.